Sept. 19, 1961     A. R. DE VITO     3,000,204
DOOR CONTROL MECHANISM

Filed Aug. 23, 1957     7 Sheets-Sheet 1

INVENTOR.
ANGELO R. de VITO
BY
ATTORNEYS

Sept. 19, 1961  A. R. DE VITO  3,000,204
DOOR CONTROL MECHANISM
Filed Aug. 23, 1957  7 Sheets-Sheet 3

INVENTOR.
ANGELO R. de VITO
BY
ATTORNEYS

Sept. 19, 1961 A. R. DE VITO 3,000,204
DOOR CONTROL MECHANISM
Filed Aug. 23, 1957 7 Sheets-Sheet 4

INVENTOR.
ANGELO R. de VITO
BY Hudson, Boughton,
Williams, David & Hoffmann
ATTORNEYS Sept. 19, 1961 A. R. DE VITO 3,000,204
DOOR CONTROL MECHANISM
Filed Aug. 23, 1957 7 Sheets-Sheet 6

INVENTOR.
ANGELO R. de VITO
BY Hudson, Boughton,
Williams, David & Hoffmann
ATTORNEYS

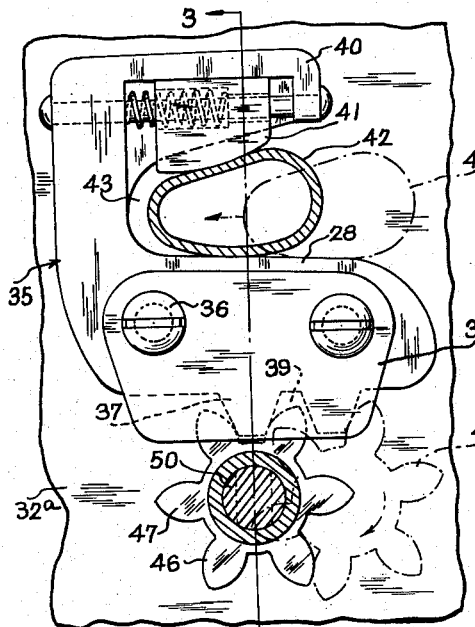

United States Patent Office 3,000,204
Patented Sept. 19, 1961

3,000,204
DOOR CONTROL MECHANISM
Angelo R. de Vito, 1913 Staunton Road, Cleveland Heights, Ohio, assignor, by mesne assignments, to Lisle W. Menzimer, Rockford, Ill., trustee
Filed Aug. 23, 1957, Ser. No. 679,968
5 Claims. (Cl. 70—264)

This invention relates to door control mechanism for vehicle doors and provide mechanism of this kind which is readily adaptable to various door control requirements and to different conditions of vehicle use.

An object of this invention is to provide vehicle door control mechanism employing a latch device having a manually settable adapter means by which the latch device can be readily converted from an unrestricted operating condition to a restricted or safe operating condition to protect young children who are passengers in the vehicle, such convertible latch device being especially suitable for use on the rear doors of automobiles for preventing the opening of those doors by children occupying the rear portion of the passenger compartment.

Another object is to provide vehicle door control mechanism of the electric type having novel electrical means for producing a desired door-locked or door-unlocked condition of the latch device of a door, and which control mechanism is applicable to all of the doors of a vehicle for use in coincidentally producing a door-locked or door-unlocked condition of the latch devices of all of the doors.

A further object is to provide novel electric door lock control means for vehicle doors in which selectively energizable solenoid means produces the door-locked and door-unlocked conditions of one or more latch devices and is controlled by a manually movable switch member, and in which indicating means associated with the switch member indicates the locked or unlocked condition of the latch devices.

Still another object is to provide a novel electric door lock control system in which such a manually movable switch member and indicating means are incorporated in a master switch device located on the instrument panel of the vehicle.

Yet another object is to provide an electrically controlled lock system for multiple vehicle doors in which the latch device of one or both of the front doors of the passenger compartment embodies a key-actuated means for producing a locked or unlocked condition of such latch device, and in which switch means associated with the key-actuated means is responsive thereto for causing the electric means to produce a locked or unlocked condition of the latch devices of one or more other doors of the vehicle.

As still another object, this invention provides an electric lock system for vehicle doors in which solenoid means in the form of an adapter unit is applicable to a manually operable latch device to render the same electrically operable to locked and unlocked conditions.

It is also an object of this invention to provide an electric control means, which is usable with a door latch device having a pivoted locking lever effective on a latch member through a holding or detent means for producing a locked or unlocked condition of the latch device, such control means comprising a pair of selectively energizable locking and unlocking solenoids for swinging the locking lever to a locking or releasing position, and wherein the solenoids are of the plunger type and are located on opposite sides of a median line passing through the pivot axis of the locking lever and have their plungers movable in the direction of the median line and connected with the locking lever by thrust links.

As a further object, this invention provides an electric locking system for vehicle doors in which the latch member of the latch devices is a pivoted latch member, and in which the indicating means of the master control switch comprises an automatically functioning telltale means responsive to the manual actuation of the master switch.

This invention also provides, as a further object thereof, a novel electric door lock system for vehicle doors in which the latch devices include a locking member adapted to be moved to locking or unlocking positions by a solenoid means, and in which the latch devices are of the sequentially operable type, that is, are of the kind in which the unlocking movement imparted to the locking member does not cause unlatching of the latch member relative to the keeper.

Other objects and advantages of this invention will be apparent in the following detailed description, and in the accompanying drawings forming a part of this specification and in which.

Figure 3:
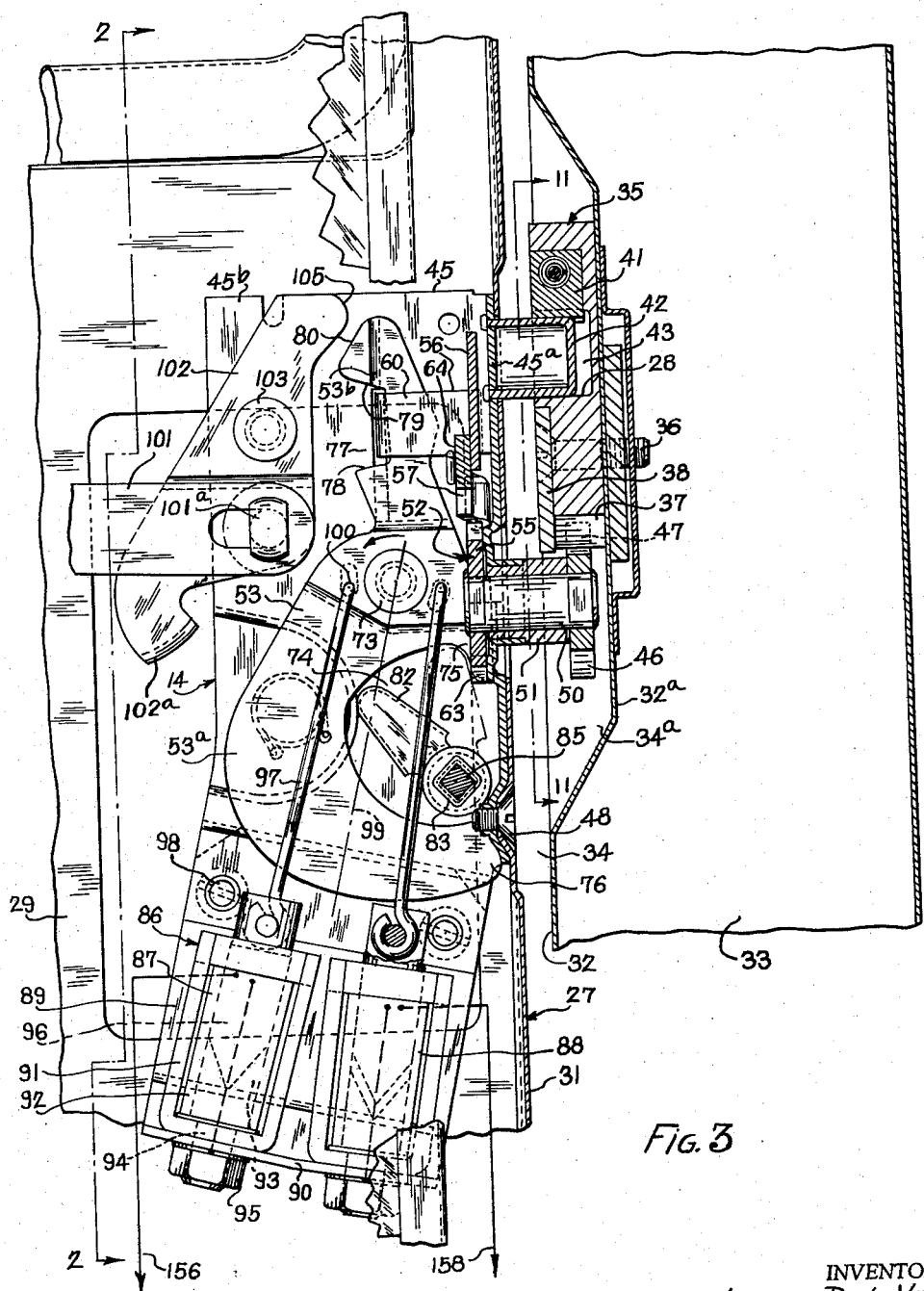
FIG. 3 is a partial longitudinal vertical section taken through the latch device and keeper of the same door and its associated doorframe, as indicated by section line 3—3 of FIGS. 2 and 11.
Figures 4, 5:
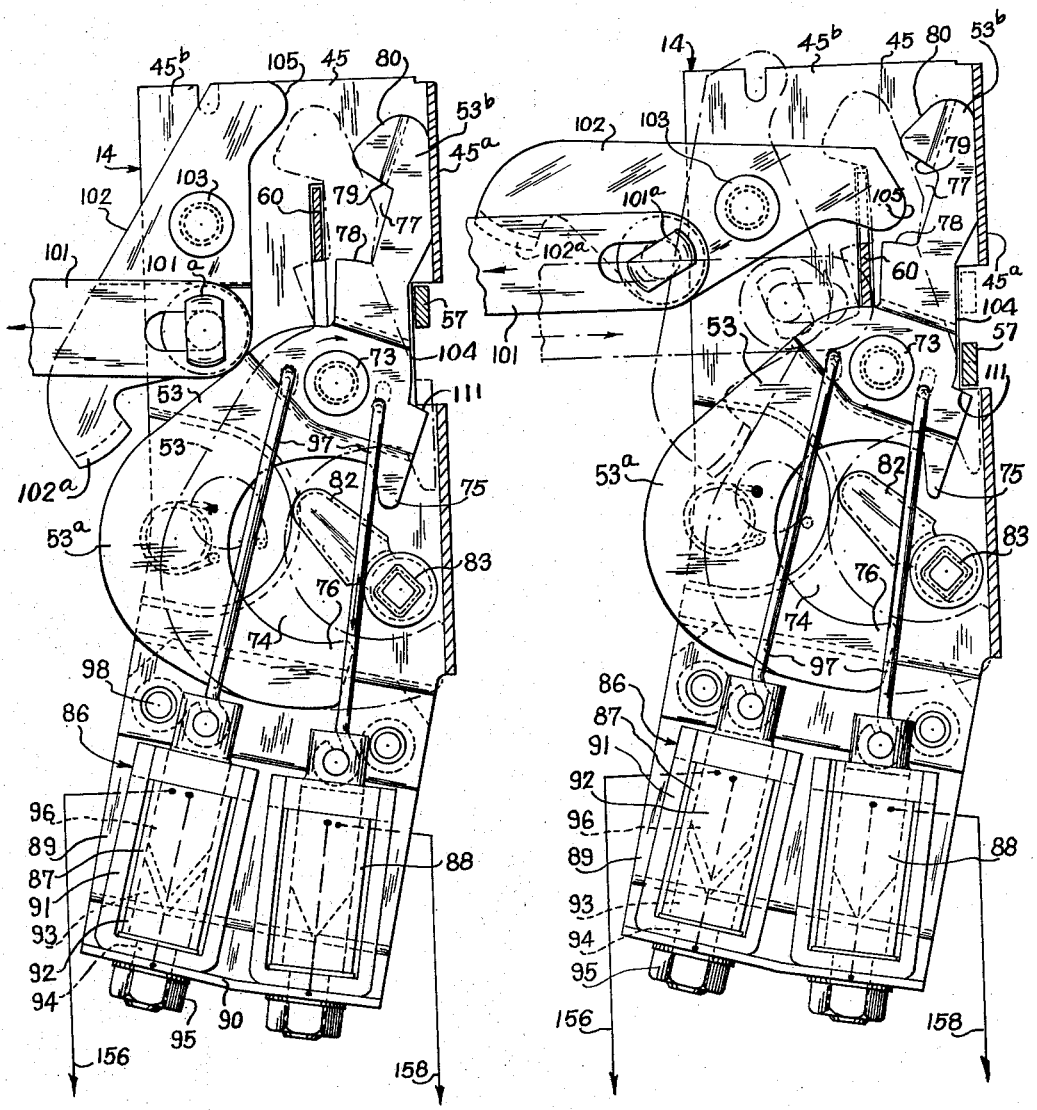

FIGS. 4 and 5 are partial longitudinal vertical sections corresponding with a portion only of FIG. 3 and showing components of the latch device in different operating positions, both of FIGS. 4 and 5 showing the locking lever in its releasing position relative to the detent means and FIG. 5 showing the detent lever as having been actuated by the inside control means of the door to release the latch member.

Figure 6:
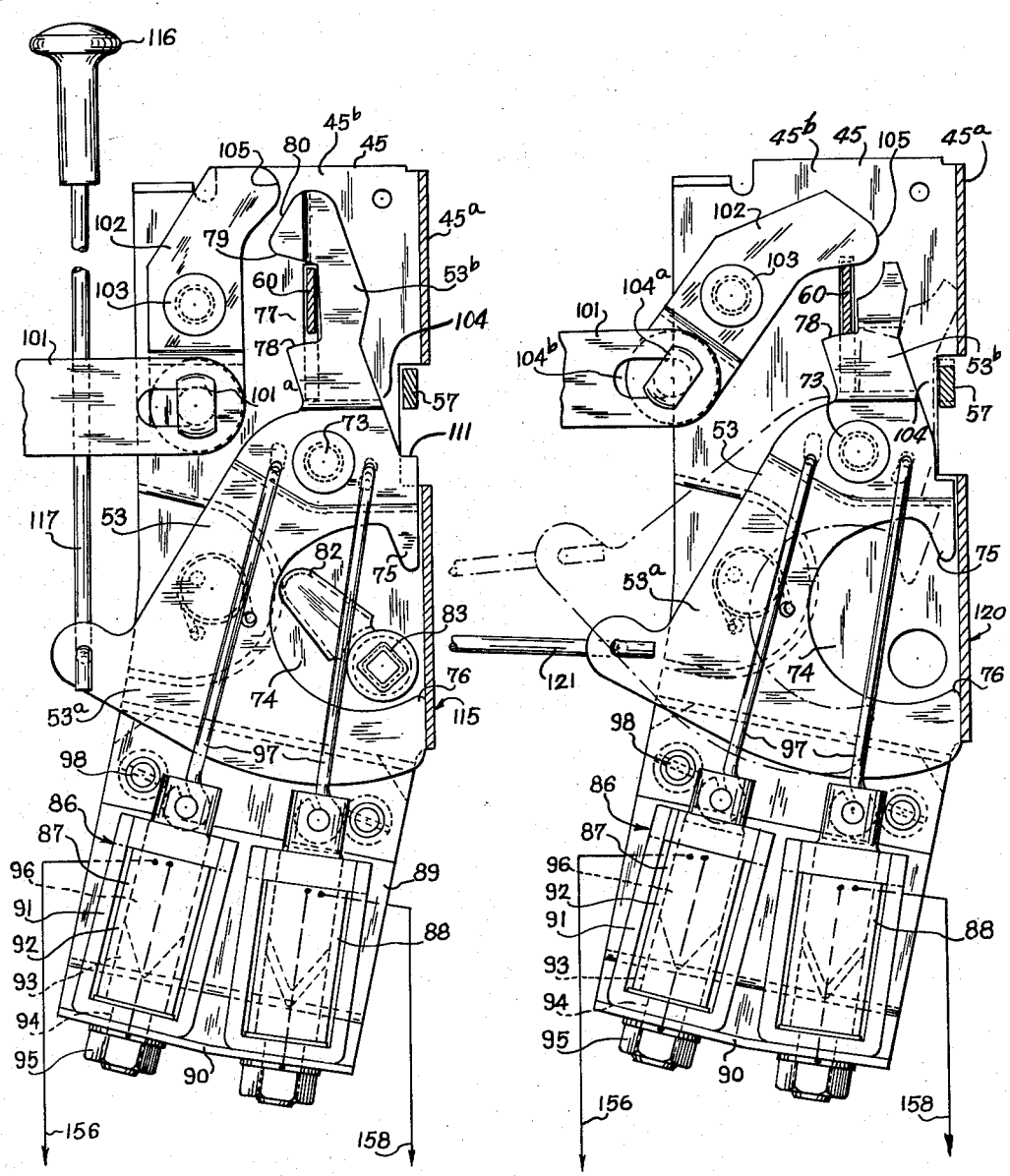

FIG. 6 is a partial longitudinal vertical section similar to those of FIGS. 4 and 5 but with the locking lever in its locking position in engagement with the detent lever and with another form of inside control means for the latch device.

Figures 7, 8, 10:
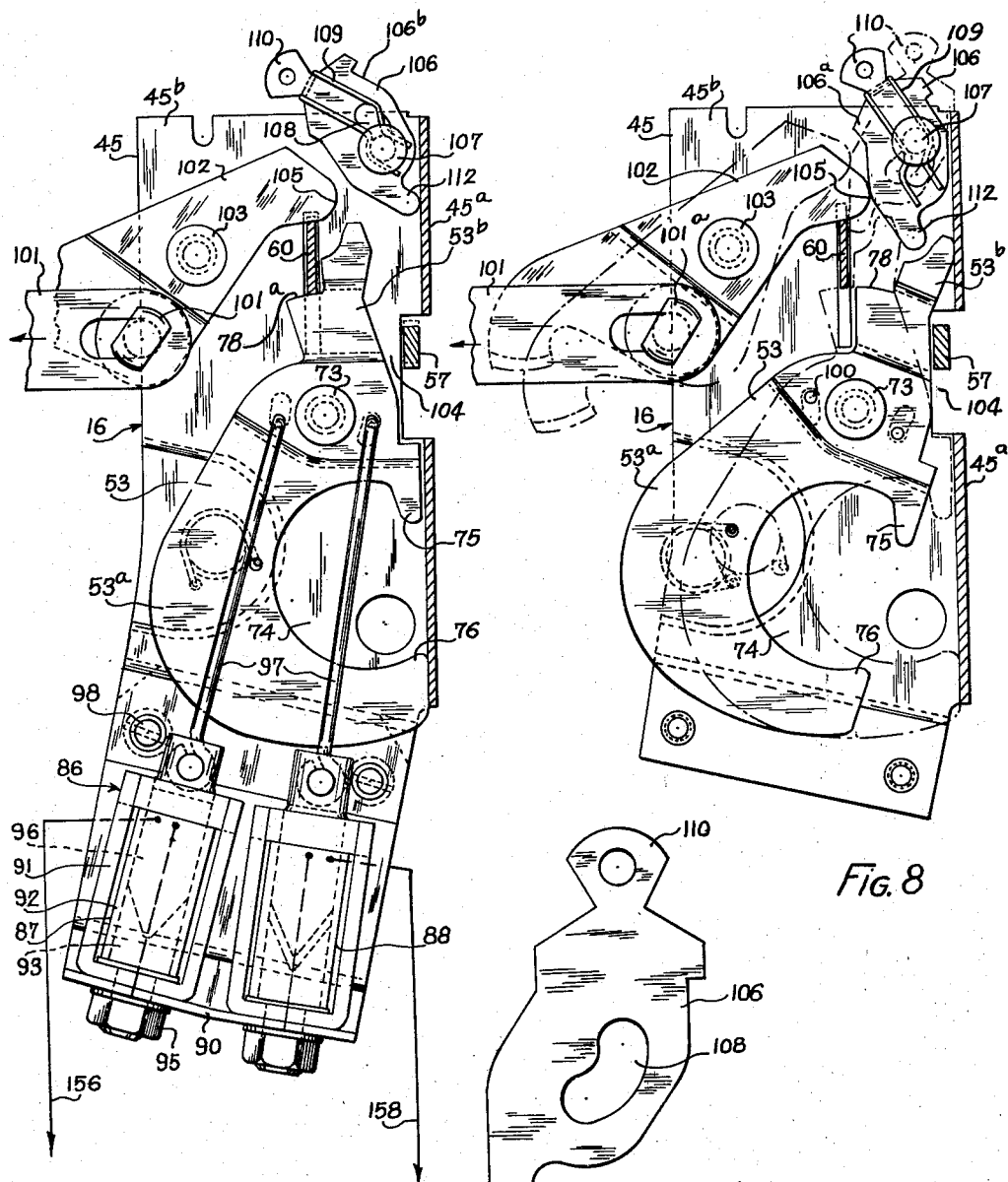

FIG. 7 is a partial longitudinal vertical section similar to that of FIG. 3 but showing the latch device of a rear door of the vehicle, the locking lever of the device being shown in its locking position and a conversion adapter member of the device being shown in its inoperative position.

FIG. 8 is a similar view of the same rear door latch device but showing the same with the conversion adapter member thereof in its operative position and with the solenoid means omitted from the device.

FIG. 9 is a view similar to that of FIG. 7 but showing the rear door latch device with the conversion adapter member omitted therefrom and also showing the rear door latch device provided with a different form of inside control means.

FIG. 10 is an elevation showing the conversion adapter member of the rear door latch device in a detached relation.

FIG. 11 is a partial vertical section taken transversely of the pivot shaft of the latch device, as indicated by section line 11—11 of FIG. 3, and showing the cooperation of the latch member with its associated keeper.

Figure 2:
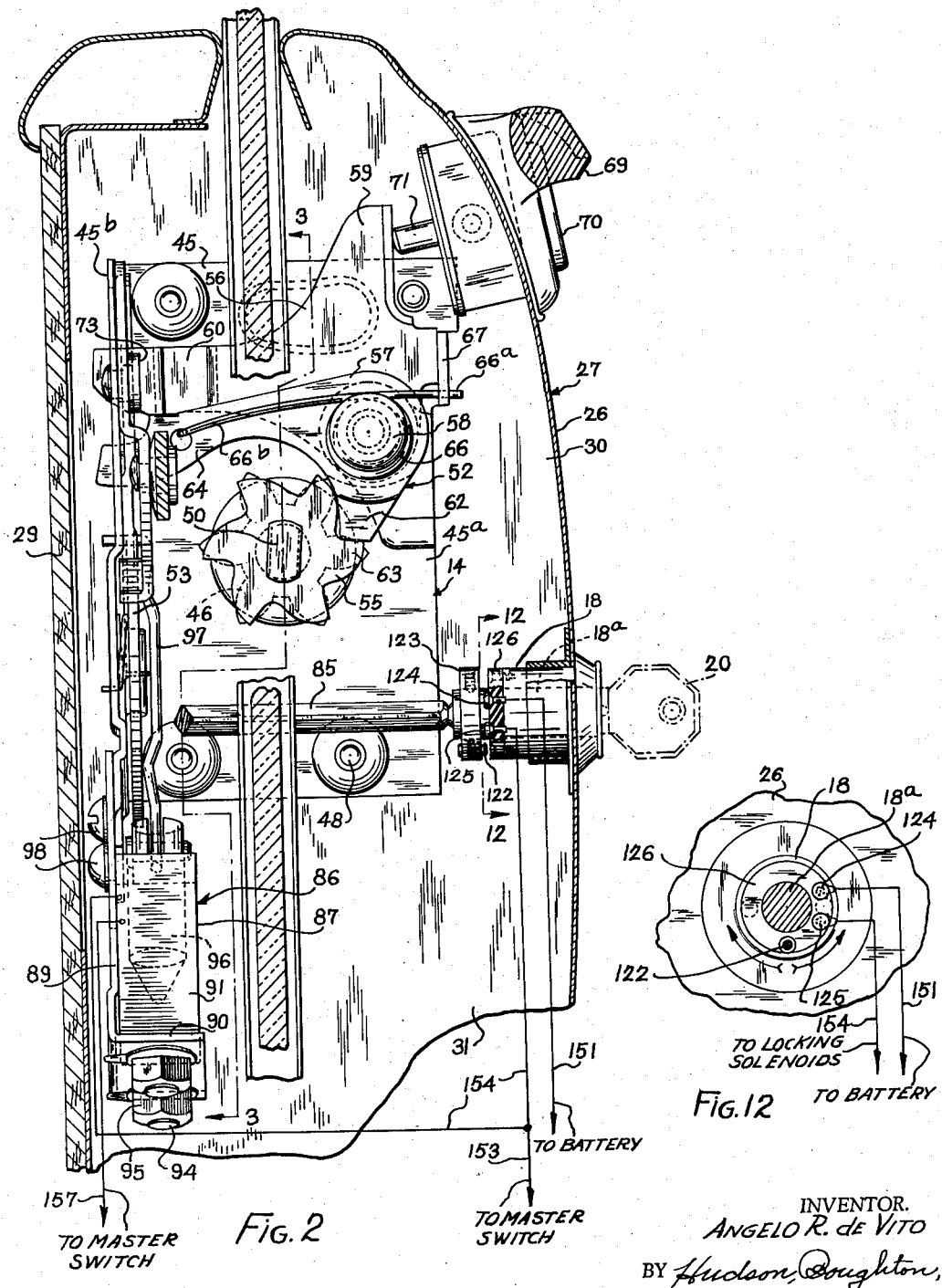
FIG. 2 is a partial transverse vertical section taken through the left front door of the vehicle at the location of the latch device thereof and looking in a rearward direction toward the free rear edge of the door, as indicated by section line 2—2 of FIG. 3.

FIG. 12 is a transverse sectional detail view of a control switch associated with the key-actuated means of one of the front doors, the view being taken as indicated by section line 12—12 of FIG. 2.

FIG. 13 is a front view of the master switch device of the locking system.

FIG. 14 is a transverse section taken through the master switch device as indicated by section line 14—14 of FIG. 13.

FIG. 15 is a rear view of the master switch device taken as indicated by the directional line 15—15 of FIG. 14.

Figure 1:
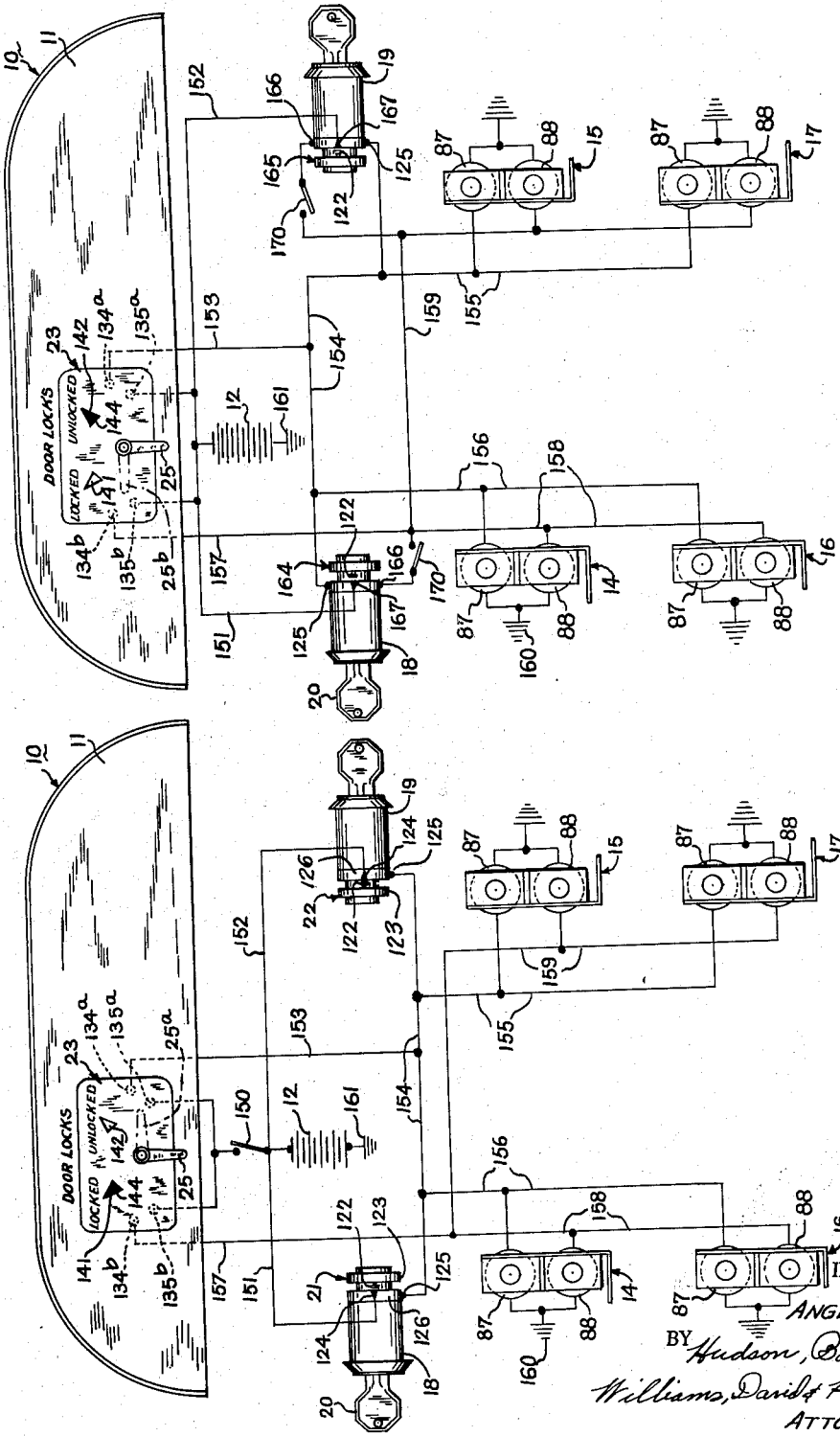
FIG. 1 is a diagrammatic plan view illustrating door control mechanism of the present invention and showing the same with latch devices thereof applied to the front and rear doors of a conventional passenger vehicle or automobile and with such latch devices embodied in an electrical locking system.

FIG. 16 is a diagrammatic plan view similar to that of FIG. 1 but showing another form of the locking system in which electric unlocking of the latch devices can be accomplished by the key-actuated switches of the front doors.

FIG. 17 is a detached elevational view showing one of the key-actuated control switch devices of the locking system of FIG. 16; and FIG. 18 is a transverse section taken through the key-actuated switch device of FIG. 17 as indicated by the section line 18—18 of the latter view.

The door control mechanism of the present invention is shown in FIG. 1 as applied to a passenger vehicle or automobile 10 having an instrument panel 11 and a storage battery 12. The door control mechanism includes latch devices 14 and 15 applied to the two front doors of the vehicle and latch devices 16 and 17 applied to the two rear doors of the vehicle. The latch devices 14 and 15 of the two front doors of the vehicle are provided with conventional cylinder-type locks 18 and 19 which are actuatable by means of a key 20 inserted thereinto. Additionally, the door control mechanism includes switch devices 21 and 22 associated with the key-actuated locks 18 and 19, and a master switch device 23 located on the instrument panel 11 and having a manually operable switch member 25.

The latch devices 14 and 15 are of the same construction and therefore only one of these devices need be described in detail, in this case the latch device 14, which is shown in FIGS. 2 and 3 of the drawings as applied to the left front door 27 of the vehicle. Likewise, the latch devices 16 and 17 of the rear doors are of the same construction and only one of these devices need be described in detail, in this case the latch device 16, which is illustrated in FIG. 7 of the drawings.

This application is related as to subject matter and ownership to copending application, Serial No. 203,160 filed December 28, 1950, now Patent No. 2,811,381 issued October 29, 1957, which discloses and claims mechanical latch devices of a similar type providing for sequential functioning, that is, providing for unlocking of the latch member without unlatching the same.

The doors of the vehicle 10 are of a conventional construction and are swingably mounted for opening and closing movements by being hinged to associated doorframes. By way of example, the front door 27 is shown as having spaced outer and inner side walls 26 and 29 providing a chamber 30 therebetween in which the latch device 14 is located. The front door 27 also has an upright edge wall 31 at its free rear edge and which lies in an opposed relation to an edge wall 32 of the associated doorframe 33, with an intervening cleavage crevice 34 therebetween, when the door is in its closed and latched position as shown in FIG. 3. The edge wall 32 of the doorframe has an offset wall portion 32a on which a keeper 35 is mounted as by means of one or more attaching screws 36. This offset of the wall 32 provides the cleavage crevice 34 with an extension recess 34a to accommodate the keeper 35.

The keeper 35 is shown in FIGS. 3 and 11 as being of the gear type and includes a rack member 37 located in the cleavage crevice 34. The keeper 35 also includes a cover plate 38 overlying the tooth space or spaces 39 of the rack member 37, and further includes an upper portion forming a door support member 40 having a thrust portion 28 and a shiftable wedge block 41 spaced thereabove. A second door support member 42 projects from the edge wall 31 of the door 27 into the cleavage crevice 34 and is movable into the space or pocket 43 of the first door support member 40 for cooperation with the wedge block 41 and the thrust portion 28, when the door swings to its closed position. This second door support member 42 is here shown as being a portion of the latch device 14 which projects through an opening of the edge wall 31.

The latch device 14 includes a support structure in the form of a mounting plate 45 having substantially rightangularly disposed wall portions 45a and 45b, and a pivoted latch member 46 which is engageable with the keeper 35 of the doorframe 33 when the door is moved to its closed or door-latched position. The latch member 46 is here shown as being in the form of a gear or pinion having teeth 47 engageable in the tooth spaces 39 of the rack member 37 of the keeper. The latch device 14 is mounted on the door 27 by having the wall or base portion 45a of the mounting plate 45 secured against the edge wall 31, as by means of suitable connecting screws 48.

The latch device 14 also includes a pivot shaft 50 which extends through the wall portion 45a of the mounting plate and is journalled in a bushing projection 51 of the latter. The latch member 46 is secured in a fixed relation on the outer end of the pivot shaft 50 and is spaced somewhat from the edge wall 31 so as to be movable into the extension recess 34a of the cleavage crevice 34 for engagement with the keeper 35 when the door 27 is moved to its closed position.

As shown in FIGS. 2 and 3 the latch device 14 also comprises detent means 52 for releasably holding the latch member 46 in a door-latched position when the latter is in engagement with the keeper 35, and by which the latch member can be released for pivotal unlatching movement in disengaging the keeper during opening movement of the door 27. The latch device 14 further includes a locking member, which is shown herein in the form of a lever 53, and which is movable to locking and releasing positions relative to the detent means 52 for causing the latter to maintain the latch member 46 in its door-latched position and door-locked condition, or to release or unlock the latch member for unlatching from the keeper 35.

The detent means 52 (see FIG. 2) comprises a detent member in the form of a ratchet wheel 55, an actuating member or detent lever 56, and a detent member or pawl 57. The ratchet wheel 55 is fixed on the inner end of the pivot shaft 50 so as to be rotatable with the latch member 46. The detent lever 56 is swingable on a pivot member 58 carried by the wall portion 45a of the mounting plate and is in the form of a bell crank lever having arm portions 59 and 60. The pawl 57 is also mounted on the pivot member 58 and is swingable relative to the detent lever 56. The pawl 57 has a detent finger 62 which is in blocking cooperation with the teeth 63 of the ratchet wheel 55 and an arm 64 which extends in the same general direction as the arm portion 60 of the detent lever 56 and is located below the latter arm portion.

A spring 66 is provided for the pawl 57 and has the coiled body portion thereof disposed around the pivot member 58 and with its ends 66a and 66b extending in opposite directions away from the pivot member. The spring portion 66a is seated against a stop lug 67 of the plate portion 45a and the spring portion 66b acts on the arm 64 of the pawl 57 tending to swing the pawl in a clockwise direction about the pivot member 58, as seen in FIG. 2, for causing the arm 64 to engage the lower edge of the arm portion 60 and the finger 62 to engage the ratchet wheel 55. With the mounting thus provided for the pawl 57 this member will effectively prevent counterclockwise rotation of the latch member 46 to enable the latter to retain the door in its closed and latched position, but will always permit clockwise rotation of the latch member.

The outer wall 28 of the door 27 is provided with a conventional handle 69 having a push button 70 located in or adjacent thereto. The push button 70 forms an outside control means for manual actuation of the latch device 14 from the outer side of the door. The push button 70 has a thrust stem 71 engageable with the arm portion 59 of the detent lever 56 for causing swinging of the latter in a counterclockwise direction about the pivot member 58 for disengaging the detent finger 62 of the pawl 57 from the ratchet wheel 55. The release of the ratchet wheel 55 by the finger 62 allows the latch member 46 to rotate in a counterclockwise or unlatching direction, as seen in FIG. 2, to disengage the rack member 37 of the keeper 35 and permit an opening movement of the door 27.

The locking lever 53 is swingably mounted on the wall or flange portion 45b of the mounting plate 45 by means of a pivot member 73. The lower arm portion 53a of this locking lever is provided with a crescent-shaped recess 74 and has horn-shaped portions 75 and 76 on opposite sides of this recess. The upper arm portion 53b of the locking lever 53 cooperates with the arm portion 60 of the detent lever 56 for producing a locking action on the latch member 46 through the detent means 52. The upper arm portion 53b has a recess 77 therein lying between a pair of shoulders 78 and 79. The recess 77 is of a width to receive the arm portion 60 of the detent lever 56 therein. The extreme upper end of the arm portion 53b is provided with an inclined cam portion 80 on the edge thereof for a purpose to be explained hereinafter.

An actuating finger 82 is pivotally mounted on the plate portion 45b and is located in the crescent-shaped recess 74 of the locking lever 53 for cooperation with the horn portions 75 and 76. The pivot means for the actuating finger 82 includes a bushing portion 83 having a noncircular passage therein. The cylinder lock 18 of the front door 27 includes a noncircular actuating stem 85 which extends into the noncircular passage of the bushing portion 83 for imparting swinging movement to the finger 82.

In FIG. 3 of the drawings the locking lever 53 is shown in its locking position in relation to the detent means 52, at which time the shoulders 78 and 79 of this lever are in a straddling relation to the arm portion 60 of the detent lever 56 and the latter arm portion then lies in the recess 77 such that swinging of the detent lever 56 on its pivot member 58 is prevented. When the locking lever is in this position it is effective on the latch member 46, through the detent means 52, and establishes a door-locked condition of the latch device 14 by preventing door-unlatching rotative movement of the latch member.

The locking lever 53 is swingable to its locking position by rotation of the key 20 in a direction to swing the actuating finger 82 in a clockwise direction, as seen in FIG. 3, for producing a camming action of the finger against the adjacent edge of the horn portion 75. The locking lever 53 is swingable in the opposite direction to its releasing position shown in FIGS. 4 and 5 by the camming action of the finger 82 against the edge of the crescent recess 74 while the finger is being swung toward the horn portion 76. When the locking lever has been swung to its releasing position, the upper portion 53b of this lever moves out of straddling relation to the arm portion 60 of the detent lever 56 such that the detent lever is then unlocked and freely swingable in a counterclockwise direction, as seen in FIG. 2, by means of the push button 70. This is the counterclockwise movement of the detent lever 56 which causes the detent means to release or unlock the latch member 46 for unlatching from the keeper 35 as explained above.

In accordance with the present invention, the latch device 14 is provided with solenoid means 86 for imparting the locking and releasing swinging movements to the locking lever 53. The solenoid means 86 is here shown as comprising a pair of locking and unlocking solenoids 87 and 88 which are of the plunger type and are selectively energizable. The solenoid means 86 also comprises a support plate 89 having a bottom flange 90. This invention contemplates having the solenoid means 86 in the form of an adapter device which can be applied to the latch device 14 as a preformed unit. When the solenoid means is of this adapter form it can be applied to the latch device 14 either as part of the original equipment of the vehicle or can be installed in the field as added or auxiliary equipment.

The locking and unlocking solenoids 87 and 88 each comprise a substantially U-shaped magnet frame 91 having a magnet coil 92 therein, and a fixed core member 93 located in the coil and having a threaded stem portion 94 extending through the U-shaped frame and the edge flange 90 and engaged by a clamping nut 95 for mounting the solenoid on the support plate 89. Each of the solenoids 87 and 88 also comprises a plunger 96 movable in the coil 92 and relative to the fixed core member 93 in response to electrical energization of the coil. The plungers 96 of the solenoids have thrust links 97 attached thereto which extend toward the pivot member 73 and have their upper or remote ends connected to the locking lever 53 on opposite sides of, and at substantially equal lever arm distances from, the axis of this pivot member.

The solenoid means 86 is applied to the latch mechanism 14 by attaching the support plate 89 to the wall portion 45b of the mounting plate 45, as by means of the screws 98, with the locking and unlocking solenoids 87 and 88 located below the locking lever 53. The solenoids 87 and 88 and their respective connecting links 97 lie on opposite sides of a median line 99 passing through the axis of the pivot member 73. The upper ends of the links 97 are connected to the locking lever 53 by the provision of bent portions on the links which engage in holes 100 of the locking lever.

When the solenoid means 86 is applied to the latch mechanism 14 in this relation, it will be seen that energization of the locking solenoid 87 will move the plunger 96 thereof downwardly causing the corresponding link 97 to apply a downward pull to the locking lever 53 to thereby swing the latter in a counter-clockwise direction to its locking position shown in FIG. 3. Similarly, energization of the unlocking solenoid 88 will produce a downward movement of the plunger 96 thereof to cause the corresponding link 97 to swing the locking lever 53 in a clockwise direction to its releasing position shown in FIG. 4.

As shown in the drawings, the points of connection between the upper ends of the links 97 and the locking lever 53 are on opposite sides of the axis of the pivot pin 73 and at relatively short lever-arm distances therefrom. Such a short lever-arm distance is very advantageous because the solenoids 87 and 88 can then be short-stroke solenoids for maximum power development and rapidity of action, as well as of a very compact and inexpensive form.

The door 27 is also provided with inside or remote control means for releasing the latch member 46 to permit opening movement of the door from within the passenger compartment. This inside control means comprises a conventional swingable inside handle (not shown), and motion transmitting means extending from the handle to the latch device 14 and comprising a link 101 and an unlatching or remote control lever 102 swingably supported on the wall portion 45b by a pivot member 103. The link 101 connects the inside handle with the pin 101a of the unlatching lever 102 such that swinging of the handle in a direction to unlock the latch member or to unlatch the door will cause a clockwise swinging of the unlatching lever on the pivot member 103. The lever 102 can, if desired, be provided with an arm 102a for engagement with the lower portion 53a of the locking lever 54 for causing swinging of the latter lever to its locking position in response to swinging of the inside handle in a door locking direction.

The unlatching lever 102 has a rounded cam portion 105 thereon which is engageable with the cam portion 80 of the locking lever 53 for shifting the latter from its locking position of FIG. 3 to its releasing or unlocking position of FIG. 4. During actuation of the unlatching lever 102 by the inside handle, the first portion of the swinging of the unlatching lever actuates the locking lever to its releasing position for unlocking the detent means without causing unlatching of the latch member, and the second or succeeding portion of the swinging movement of the unlatching lever 102 causes this lever to engage the arm portion 60 of the detent lever 56 for actuating the detent means 52 in a direction to release the latch member 46 for door unlatching movement thereof.

As shown in the drawings, the locking lever 53 is provided with an edge recess 104 which accommodates the pawl 57 and, in the case of the front door latch devices 14, 15 and 115, is of a length such that upon swinging of the pawl by the ratchet wheel 55, the pawl will engage a shoulder 111 of the locking lever and swing the latter from its locking position to its unlocking position to insure against the possibility of the operator locking himself out of the vehicle by the closing of the front doors. In the case of the rear door latch devices, such as the latch devices 16, 17 and 120, the edge recess 104 is relatively longer such that the pawl 57 will not cause swinging of the locking lever out of its locking position when the rear doors are closed.

FIGS. 7 and 8 of the drawings show one of the rear door latch devices, for example the latch device 16, which is generally similar to the front door latch device 14 described in detail above. In FIGS. 7 and 8 the detent means is represented only by the portion of the pawl 57 which appears in cross-section in these views. The latch device 16 differs from the latch device 14 mainly as to the shape of the upper portion of the locking lever 53.

In the rear door latch device 16 the cam portion 80 at the upper end of the locking lever 53 has been omitted, such that the clockwise swinging movement imparted to the unlatching lever 102 by the inside handle of the door will be ineffective to cause actuation of either the locking lever 53 or the detent lever 56. An attempt to cause unlatching of the rear door by swinging of the inside handle thereof will merely cause the unlatching lever 102 to engage the arm portion 60 of the detent lever 56 but the engagement of the arm portion 60 with the lower thrust shoulder 78 of the locking lever will prevent any swinging of the detent lever at this time. Such inability of the unlatching lever 102 to actuate the locking lever 53 or the detent lever 56 is desirable for the rear door latch device 16 for the purpose of preventing unlatching and opening of the rear door by young children occupying the rear portion of the passenger compartment.

The present invention also provides conversion adapter means (see FIGS. 7 and 8) for the rear door latch device 16 by which this latch device can be readily converted to a form in which unlatching of the door can be accomplished by swinging of the inside handle. This conversion adapter means is here shown as comprising a thrust transmitting lever 106 swingably mounted on the wall portion 45b by a pivot member 107. The lever 106 is provided with an arcuate slot 108 which cooperates with the pivot member 107 in such a manner that this lever is operatively swingable for thrust transmitting purposes and is also shiftable from an effective or operative setting 106a shown in FIG. 8 to an inoperative or parked setting 106b of FIG. 7, and vice versa.

A hairpin spring 109 mounted on the lever 106 and straddling the pivot member 107 cooperates with the latter for retaining the lever in either its operative or inoperative position. The lever 106 is manually shiftable to its operative and inoperative positions and, for this purpose, is provided at the upper end thereof with an eye portion 110 which is accessible through the window slot of the garnish molding of the door, as by means of a wire hook or the like inserted through that slot and engaged in the eye portion.

The thrust transmitting lever 106 includes a lower finger portion 112, and, when this lever is moved to its operative setting 106a, the finger portion thereof extends in an intervening relation between adjacent portions of the locking lever 53 and the unlatching lever 102 as shown in FIG. 8. It will accordingly be seen that when the thrust transmitting lever 106 is in its operative setting 106a, swinging of the unlatching lever 102 by means of the inside handle of the door will result in a swinging of the adapter lever by the unlatching lever during the first portion of the swinging movement of the latter. This swinging movement of the adapter lever 106 is represented in FIG. 8 and, through the finger portion 112, is effective on the locking lever 53 for swinging the latter to its full-line releasing position shown in FIG. 8. The subsequent swinging movement of the unlatching lever 102 will then be effective on the arm portion 60 of the detent lever 56 for actuating the detent means to cause the latter to release the latch member 46 for door-unlatching movement.

When the thrust transmitting lever 106 is in its inoperative or parked position 106b, as shown in FIG. 7, the finger 112 is retracted from between the adjacent portions of the locking lever 53 and the unlatching lever 102 such that the unlatching lever is ineffective to cause swinging of either the locking lever or the detent lever in response to swinging of the inside handle. The rear door latch device 16, when thus converted to a safe condition, cannot be actuated to a door-unlatched condition by the outside push button 70 nor by the inside lever, until after actuation of the locking lever 53 by the solenoid means 86.

FIG. 6 of the drawings shows a door latch device 115 which is similar to those already described above, and which is usable on either the front or rear doors of the vehicle. The components of the latch device 115 which correspond with components of the latch devices already described above have been designated by the same reference characters.

The modified latch device 115 differs from the latch devices 14 and 16 in that the inside actuating means for this latch device includes a garnish molding knob 116 which is connected with the lower portion of the locking lever 53 by means of a push-pull link 117. In this modified latch device 115, the knob 116 and connecting link 117 provide an additional means for manually actuating the locking lever 53 to its locking and releasing positions. The locking lever 53 can thus be actuated to its locking and releasing positions by any one of three agencies, namely, the knob 116, the key-actuated finger 82 or the solenoid means 86; and can also be actuated to its releasing position by the unlatching lever 102.

FIG. 9 of the drawings shows another modified form of latch device 120 which can be used to advantage on the rear doors of a vehicle. The modified latch device 120 is very similar to the rear door latch device 115, differing therefrom mainly by the omission of the adapter conversion lever 106 and by having the inside actuating means for the latch device include a push-pull link 121 extending from a garnish molding knob or the like and connected with the lower portion of the lever 53. Swinging of the locking lever 53 to its locking and releasing positions can be produced either by the garnish molding knob and the link 121 or by the solenoid means 86, to permit unlatching of the door by actuation of either the outside or inside control means thereof.

The switch means and circuitry for the solenoid means 86 of the latch devices will be described next. As shown in FIGS. 2 and 12, the switch devices 21 and 22 associated with the cylinder locks 18 and 19 of the front doors of the vehicle each comprise a movable switch contact 122 and a pair of stationary contacts 124 and 125 adapted to be engaged and bridged by the movable contact. The stationary contacts 124 and 125 are supported by an insulating member 126 which is secured to the stationary outside barrel of the cylinder lock. The movable contact 122 is carried by an insulating member 123 which is secured to the rotatable inner member 18a of the cylinder lock, such that upon rotation of the inner member and the actuating stem 85 by the key 20, the movable contact 122 can be moved into or out of bridging engagement with the stationary contacts 124 and 125.

The switch devices 21 and 22 are of the same construction and are actuated in the same manner by the use of the key 20 in the cylinder locks 18 and 19 of the respective front doors of the vehicle. In the switches 21 and 22 the stationary contact 124 is a current supply contact which can conveniently be referred to as a battery contact and the stationary contact 125 can be referred to as a locking control contact.

The master switch device 23 (see FIGS. 1 and 13 to 15) is mounted on the instrument panel 11 and comprises an insulating block 128 lying to the rear of a switch cover plate 126, and a shaft 129 rotatable in the block and in a sleeve projection 127 of the cover plate by a manually operable switch member or handle 25 secured to such shaft. This switch device also comprises an insulating member 131 fixed on the shaft 129 and carrying a movable contact 132. Additionally, the master switch 23 comprises pairs of stationary contacts 134 and 135 mounted in an adjacent relation on the insulating block 128 with the pairs of such stationary contacts located on diametrically opposite sides of the shaft 129, such that swinging of the member 25 in opposite directions from its intermediate open-switch position through an arcuate distance of approximate 90 degrees to locking and unlocking positions 25a and 25b, will cause the movable contact 132 to be shifted into bridging engagement with one or the other pair of the stationary contacts 134 and 135. One of the bridging positions of the movable contact is indicated at 132a in FIG. 15.

The switch member 25 normally occupies the intermediate open-switch position in which this member is shown in full lines in FIGS. 1 and 13 to 15 inclusive of the drawings. When the switch member 25 is in this open-switch position, the movable contact 132 is in engagement with a detent member 136 which releasably retains the switch member in this open-switch position and prevents accidental movement of the movable contact 132 into engagement with the stationary contacts 134 and 135.

When the movable contact 132 is moved into bridging engagement with one of the pairs of stationary contacts 134 and 135 by manual swinging of the switch member 25, the movable contact will remain in such bridging relation only as long as the switch member is manually held in its actuated position. As soon as the switch member 25 is released, the movable contact 132 will be returned to its open-switch position.

This is accomplished by a tension spring 137 located in a pocket 140 on the rear side of the insulating block 128 and having its upper end attached to an anchor pin 138. The lower end of the spring 137 is attached to a lever member 139 which has a washer portion secured to the shaft 129 and is swingable by the latter to tension the spring in response to swinging of the switch member 25 to either of its switch-closed positions 25a and 25b. The tensioned position of the spring 137 is indicated at 137a in FIG. 15.

In accordance with another feature of the present invention the master switch device 23 is provided with an indicating or telltale means for indicating the locked or unlocked condition of the vehicle doors. This indicating means is here shown as comprising arcuately spaced indicating stations or window openings 141 and 142 of the cover plate 127, and an indicating arm 143 swingable about the axis of the shaft 129 and carrying an indicating element or flag member 144 for positioning at one or the other of the indicating stations or windows 141 and 142. The indicating means also comprise a lever member 145 fixed on the shaft 129 and having arcuately spaced fingers 146 and 147 for selective engagement with the indicating arm 143. The indicating arm 143 includes a mounting ring 143a rotatably slidable on the support sleeve 127 of the cover plate 126. The mounting ring frictionally grips the sleeve 127 to prevent accidental swinging of the indicating arm.

As shown in FIGS. 1 and 13, the master switch device 23 can be provided with designating indicia such as the word "locked" adjacent the station or window 141 to designate the locked condition of the latch devices of the vehicle doors, and the word "unlocked" adjacent the station or window 142 to designate the unlocked condition of the latch devices. When the indicating station 141 and 142 are windows or window openings, the movable indicating element 144 is a colored flag member which will be visible through the window or window opening to which it has been moved. The upper stationary contacts 134a and 134b of the master switch 23 which correspond with the locking and unlocking stations 141 and 142 respectively, can be referred to as locking and unlocking control contacts. The lower stationary contacts 135a and 135b are current supply contacts and can be referred to as battery contacts.

Upon manual movement of the switch member 25 to shift the movable contact 132 into bridging engagement with one pair of the stationary contacts 134 and 135, the lever member 145 will rotate with the shaft 129 and will cause one of the fingers 146 or 147 to pick up the indicating arm 143 and thereby swing the indicating element or flag member 144 to an effective or visible position at the station or window corresponding with the pair of stationary contacts to which the movable contact has been shifted. Thus when the movable contact 132 has been moved to the bridging position 132a shown in FIG. 15, by swinging the handle member 25 to the locking position 25a, to cause energization of the locking solenoids 87 the flag member 144 will be shifted by the finger 147 to the station or window 141 to indicate the locked condition of the vehicle doors.

When the switch member 25 is released by the operator, it will be returned to the intermediate open-switch position by the spring 137 but the finger 147 of the lever member 145 which has just actuated the indicating arm 143 will move away from the latter, leaving the indicating element or flag member 144 at the indicating station or window 141 to which it has just been moved. The indicating element or flag member 144 will remain at that indicating station until the master switch device 23 has been actuated to its opposite setting, whereupon the indicating element or flag member will be shifted to the other indicating station and will then be left at the latter station when the switch member 25 is automatically returned to its open-switch position. Thus the automatic actuation of the indicating flag 144 not only serves to indicate the locked or unlocked condtion to which the latch devices have been actuated, but when the master switch is being actuated the appearance of the flag member in the appropriate window will indicate to the driver that this switch has been fully actuated to its circuit-completing position to produce the desired electric actuation of the latch devices.

FIG. 1 of the drawings shows the circuit connections extending to the solenoid means 86 of the latch devices of the front and rear vehicle doors and these circuit connections will now be described further. The battery contacts 135a and 135b of the master switch device 23 and the battery contacts 124 of the switch devices 21 and 22 associated with the cylinder locks 18 and 19 of the front doors are all connected with the storage battery 12 of the vehicle. The battery contacts 135a and 135b of the master switch device are connected with the battery 12 through a manually operable switch 150 which can be the ignition switch or a part of the ignition switch of the vehicle, or can be an independent switch. The battery contacts 124 of the switch devices 21 and 22 are connected with the battery 12 through conductors 151 and 152 such that current is supplied to these contacts from the battery without passing through the manually operable switch 150. The switch 150 can be omitted, but when provided, it serves as a disabling switch for disabling the master switch 23.

The locking and unlocking control contacts 134a and 134b of the master switch device 23 are associated, respectively with the locking and unlocking solenoids 87 and 88 of the door latch devices. The locking control contacts 125 of the key-actuated switch devices 21 and 22 are associated with the locking solenoids 87 of the latch devices. The locking contact 134a of the master switch device 23 and the locking contacts 125 of the switch devices 21 and 22 are all electrically connected with the locking solenoids 87 of the latch devices of all of the vehicle doors by conductor means comprising the conductors 153, 154, 155 and 156. Similarly, the unlocking contact 134b of the master switch device 23 is electrically connected with the unlocking solenoids 88 of the latch devices of all of the vehicle doors by conductor means comprising the conductors 157, 158 and 159. The solenoid means of each of the latch devices is provided with a common ground connection 160 for the pair of locking and unlocking solenoids 87 and 88. The battery 12 is likewise provided with a ground connection 161.

With the circuit connections above described for the switch devices 21, 22 and 23 it will be seen that when the driver of the vehicle is in the driver's seat and has closed the switch 150 he can produce a locked condition of the latch devices of all of the doors simultaneously by actuating the switch member 25 of the master switch device 23 to the locking position 25a which corresponds with the energized condition of the locking contact 134a. The driver can also cause simultaneous unlocking of the latch devices of all of the doors by swinging the switch member 25 of the master switch device 23 to the unlocking position 25b which correspond with an energized condition of the unlocking contact 134b. After each such manual actuation and release of the switch member 25 this member will return to its intermediate open-switch position, but the latch devices of the vehicle doors will remain in the locked or unlocked condition to which they have been thus electrically actuated and the flag member 144 will remain visible at one or the other of the stations 141 and 142 to indicate the corresponding locked or unlocked condition of the latch devices.

When the driver leaves the vehicle through either of the front doors thereof he can cause a simultaneous locking of the latch devices of all of the vehicle doors by rotation of the key 20 in the key-operated lock of the vehicle door through which he has emerged. If, for example, the operator left the vehicle through the left front door and has actuated the switch 21 thereof by the key 20 in a direction to shift the movable contact 122 into bridging contact with the stationary contacts 124 and 125, he will cause a simultaneous locking of the latch devices of all of the vehicle doors by energization of the locking solenoids 87 thereof. In order to withdraw the key 20 from the front door cylinder lock to which it has been applied, the operator must move the contact 122 out of bridging engagement with the stationary contacts 124 and 125 and back to its intermediate initial position shown in FIG. 12. The operator can then leave the vehicle and all of the doors will remain locked and subject to unlocking by use of the key 20 in the cylinder lock of either of the front doors upon his return to the vehicle.

When the driver returns to the vehicle he inserts the key 20 into the cylinder lock of one of the front doors and unlocks that door by swinging of the actuating finger 82 of the latch device thereof by means of the key. The swinging of the locking lever 53 to its releasing position by the finger 82 then permits the operator to unlatch the door by means of the push button 70 thereof. After entering the vehicle the operator actuates the master switch device 23 (the switch 150 is assumed to be closed) to unlock the latch devices of all of the other vehicle doors, in the event that he wishes to unlock those doors for the entry of other passengers into the vehicle. Instead of actuating the master switch device 23 to unlock the other doors of the vehicle, the driver may wish to leave the other doors locked and to lock the latch device of the door by which he has just entered. In that case, the operator can actuate the master switch device 23 to the door locking position 25a to thereby electrically produce a locked condition of the latch device of the door through which he has just entered.

Whenever the driver or any other front seat passenger wishes to leave the vehicle while the doors thereof are locked, he can do so without first actuating the master switch device 23 inasmuch as the inside control means of the two front doors will always operate to cause unlatching of the latch devices of the front doors, regardless of whether the latch devices thereof are in a locked or unlocked condition. With respect to the rear doors however, the situation is different and, if a rear seat passenger wishes to leave the vehicle while the rear doors are locked, it will usually be necessary for the driver to actuate the master switch device 23 to produce unlocking of the latch devices of the rear doors. In the event that the rear doors of the vehicle are provided with the inside control means shown in FIGS. 6 and 9 or are provided with an adapter lever 106 which is in the operative setting 106a of FIG. 8, the rear seat passenger will be able to cause unlocking of the latch device of a rear door either by actuation of the garnish molding control knob thereof or by actuation of the inside handle thereof, without requesting actuation of the master switch device by the driver.

FIG. 16 of the drawings shows a modified electric locking system using a modified form of key-actuated switch which is shown in FIGS. 17 and 18. The locking system of FIG. 16 uses latch devices on the front and rear vehicle doors which are of the same construction as have already been described above in connection with the locking system of FIG. 1. The modified locking system of FIG. 16 differs from the system of FIG. 1 mainly in the fact that the cylinder locks 18 and 19 of the front doors are provided with switch devices 164 and 165 which are double-acting in character, such that an electric unlocking of the latch devices of all of the vehicle doors can be accomplished by the unlocking of the cylinder lock of either of the front doors by means of the key 20, as well as by manipulation of the master switch device 23.

The double-acting switch devices 164 and 165 are of the same construction and one of these switch devices, in this case the switch device 164, is further illustrated in FIGS. 17 and 18 of the drawings. In the switch device 164 the key-actuatable insulating support 123 is provided with the same movable contact 122 as the above-described switch device 21, but the switch device 164 also includes a stationary unlocking contact 166 in addition to the stationary locking contact 125. In this switch device 164 the stationary contact 167 is a current supply contact or so-called battery contact which is connected with the vehicle battery 12 and is of substantial arcuate length, such that its opposite ends are located in adjacently spaced relation to the stationary contacts 125 and 166.

From the construction of the switch device 164 as shown in FIGS. 17 and 18 and described above, it will be seen that by actuation of the lock barrel 18a in a direction to cause locking of the latch device by the key 20, will also cause the movable contact 122 to be shifted into bridging engagement with the stationary contacts 125 and 167 for causing electric locking of the latch devices of all of the vehicle doors. Similarly, the rotation of the key 20 in the opposite direction will cause manual unlocking of the front door latch device to which the key has been applied and will shift the movable contact 122 into bridging engagement with the stationary contacts 166 and 167 to produce an electric unlocking of the latch devices of all of the vehicle doors.

The circuit arrangements of the modified locking system of FIG. 16 are very similar to those of the locking system of FIG. 1, insofar as the electric locking of the latch devices of the vehicle doors is concerned. Thus, in this modified locking system the locking contact 134a of the master switch device 23 and the locking contacts 125 of the switch devices 164 and 165 are all connected with the locking solenoids 87 of the latch devices of the vehicle doors by substantially the same conductor means, namely, by the conductors 153, 154, 155 and 156. The unlocking contact 134b of the master switch device 23 is connected with the unlocking solenoids 88 of the latch devices of the vehicle doors in the same manner as in the locking system of FIG. 1, that is to say, by means of the conductors 157, 158 and 159. The unlocking contacts 166 of the switch devices 164 and 165 of the locking system of FIG. 16 are connected with the unlocking solenoids 88 through the above-mentioned conductors 158 and 159 and through the additional branch conductors 168 and 169.

In the modified locking system of FIG. 16 the battery connections to the master switch device 23 and to the switch devices 164 and 165 are substantially the same as for the locking system of FIG. 1, with the exception that the manually operable switch 150 of FIG. 1 has been omitted and manually operable switches 170 have been provided in the conductor portions 159a extending from the unlocking control contacts 166 of the key-actuated switches 164 and 165. When the manual switches 170 have been opened, they disable the key-actuated switches 164 and 165 so far as the electric unlocking of the latch devices is concerned, but do not affect the operativeness of the key-actuated switches 164 and 165 for causing an electric locking of the latch devices of the doors. By the opening of the switches 170 the driver can convert the electric control system of FIG. 16 into substantially the system shown in FIG. 1.

With respect to the utility and desirability of the additional manual control means for the latch device 115 and 120 of FIGS. 6 and 9 as provided by the push-pull links 117 and 121 for the locking lever 53, and likewise with respect to the utility and desirability of the adapter lever 106 of the rear door latch device 16 as shown in FIGS. 7 and 8, it is pointed out that these features serve a very useful additional purpose in that they will provide for unlocking of the latch devices with which they are associated in the event that the magnet coils of the unlocking solenoids 88 should burn out or otherwise become defective, or in the event of some other disabling condition such as a discharged battery. In the occurrence of such a condition, the links 117 and 121 of FIGS. 6 and 9 and the adapter lever 106 of FIGS. 7 and 8 would make possible the manual actuation of the locking lever 53 to its releasing position regardless of an inoperative condition of the electric control system. Likewise, the links 117 of FIGS. 6 and 9 and the key-actuated finger 82 and 121 of FIGS. 6 and 9 would make it possible to lock the latch of FIGS. 3 and 6 would make it possible to lock the latch devices regardless of an inoperative condition of the electric system.

It should be pointed out further that when the solenoid means 86 is of the adapter unit type of construction shown in the drawings and described above, this unit can be readily applied to existing latch devices of the kind herein disclosed such that the purchaser or operator of the vehicle can exercise an election as to whether or not he wants to have his vehicle equipped with the electric locking system herein described. If the vehicle owner elects to have the electrical locking system installed on his vehicle, it is only necessary to apply the solenoid means 86 to the latch devices of the doors and to engage the links 97 of the solenoid means in the connecting holes 100 previously provided in the locking levers 53, and to install on the front doors substitute cylinder locks having key-actuated switches thereon and to also install the master switch device 23 on the instrument panel 11.

From the accompanying drawings and the foregoing detailed description it will now be readily understood that this invention provides novel door control mechanism for vehicle doors, including novel electrical locking systems for quickly and easily accomplishing an electric locking and unlocking of the latch devices of the vehicle doors. Since the functioning and certain of the advantages of the latch devices and of the electric locking systems hereof have already been described above, they need not be here repeated.

Although the novel door control mechainism and electric locking systems of this invention have been illustrated and described herein to a somewhat detailed extent, it will be understood of course that the invention is not to be regarded as being limited correspondingly in scope, but includes all changes and modifications coming within the terms of the claims hereof.

Having thus described my invention, I claim:

1. In electrically controlled door latch mechanism for vehicle doors; a mounting plate adapted for connection with a vehicle door; a latch member movably supported by said mounting plate and havnig a door-latched position in engagement with an associated keeper; holding means operably supported by said mounting plate for releasably holding said latch member against door-unlatching movement; a locking lever pivotally supported by said mounting plate for swinging to locking and releasing positions relative to said holding means for producing, through the latter, desired door-locked and door-unlocked conditions of said latch member; manually operable means effective on said locking lever for swinging the same to its locking and releasing positions; an adapter means comprising a support member carrying a pair of selectively energizable locking and unlocking solenoids; of the plunger type; means connecting said support means to said mounting plate for locating said solenoids in an associated relation to said locking lever and on opposite sides of a median line extending through the pivot axis of said locking lever; said solenoids having plungers therein axially movable in the general direction in which said median line extends; links attached at one end thereof to said plungers and having their other ends detachably connected with said locking lever at points of the latter located at relatively short lever-arm distances on opposite sidas of said pivot axis; said links being effective to transmit pulling forces to said locking lever for swinging the same to its locking and releasing positions in response to the selective energization of said solenoids; and energizing circuit means connected with said solenoids for producing the selective energization thereof.

2. In electrically controlled door latch mechanism for vehicle doors; a pivoted latch member having a door-latched position in engagement with a keeper; detent means for releasably holding said latch member against door-unlatching pivotal movement including a swingable detent lever; a locking lever swingable to locking and releasing positions relative to said detent lever for producing, through said detent means, desired door-locked and door-unlocked conditions of said latch member; manually operable means effective on said locking lever for swinging the same to its locking and releasing positions; a pair of selectively energizable locking and unlocking solenoids of the plunger type located on opposite sides of a median line extending through the pivot axis of said locking lever and having plungers therein axially movable in the general direction in which said median line extends; links attached to said plungers and connected to said locking lever at points located on opposite sides of, and at relatively short lever-arm distances from, said pivot axis for swinging said locking lever to its locking and releasing positions in response to the selective energization of said solenoids; and energizing circuit means connected with said solenoids for producing the selective energization thereof.

3. In door latch mechanism for a vehicle door having manually actuatable outside and inside control means on the outer and inner sides thereof; a mounting plate adapted to be secured to said door; a latch member pivotally supported by said plate and having a door-latched position in engagement with a keeper and also having a door-unlatching movement for disengaging said keeper; retaining means operably effective for releasably preventing the door-unlatching movement of said latch member while the latter is in said door-latched position; a locking member supported by said plate for movement to locking and releasing positions relative to said retaining means for producing, through the latter, desired door-locked and door-unlocked conditions of said latch member; said retaining means being engageable and actuatable by a portion of said outside control means and being also engageable and actuatable by a portion of said inside control means, to release said latch member for door-unlatching movement when said locking member is in its releasing position; said locking member having a blocking portion engageable by a portion of said retaining means for preventing latch releasing actuation of the latter by the inside and outside control means, when said locking member is in its locking position; a support pin on said plate; and motion transmitting means comprising a thrust member automatically shiftable on said support pin by said inside control means for transmitting motion from the inside control means to said locking member for moving the latter to its releasing position; said thrust member having effective and ineffective settings and also having a portion engageable with said locking member for transmitting actuating motion to the latter when the thrust member is in said effective setting; said thrust member and support pin having co-operating portions providing for adjustable shifting of said thrust member between said effective and ineffective thrust transmitting settings and said thrust member being manually adjustably shiftable on said pin from one to the other of said settings; said mounting plate having an upper end portion and said pivot pin being located on said upper end portion and above said locking member; said thrust member having an eye portion thereon for engagement by a manually movable tool for adjusably shifting the thrust member on said pivot pin from one to the other of said settings; said retaining means being actuatable by said outside control means to release said latch member whenever said locking member is in its releasing position regardless of whether said thrust member is in its effective or ineffective setting.

4. Door latch mechanism as defined in claim 3 wherein said inside control means includes an unlatching lever pivoted on said plate and said locking member is a lever also pivoted on said plate; said unlatching lever and the locking lever having adjacently spaced portions; and wherein said thrust member is pivoted on said support pin and the automatic shifting of said thrust member is a swinging thereof on said support pin; the cooperating portions of said support pin and thrust member comprising a slot in the latter and the adjustable shifting of said thrust member being a translatory movement thereof permitted by said slot; said thrust member having as said thrust portion a thrust finger interposable into, and retractible from, the space between said adjacently spaced portions by the adjustable shifting of the thrust member to said effective and ineffective settings.

5. In door latch mechanism for a vehicle door having manually actuatable outside and inside control means on the outer and inner sides thereof; a mounting plate adapted to be secured to said door and having upper and lower end portions; a latch member pivotally supported by said plate and having a door-latched position in engagement with a keeper and also having a door-unlatching movement for disengaging said keeper; retaining means operably effective for releasably preventing the door-unlatching movement of said latch member while the latter is in said door-latched position; a locking lever pivotally supported by said plate for swinging to locking and releasing positions relative to said retaining means for producing, through the latter, desired door-locked and door-unlocked conditions of said latch member; said retaining means being engageable and actuatable by a portion of said outside control means and being also engageable and actuatable by a portion of said inside control means, to release said latch member for door-unlatching movement when said locking lever is in its releasing position; said locking lever having a blocking portion engageable by a portion of said retaining means for preventing latch releasing actuation of the latter by the inside and outside control means, when said locking lever is in its locking position; a pair of selectively energizable locking and unlocking solenoids of the plunger type mounted on said lower end portion and located on opposite sides of a median line extending through the pivot axis of said locking lever and having plungers therein axially movable in the general direction in which said median line extends; links attached to said plungers and connected to said locking lever at points located on opposite sides of, and at relatively short lever-arm distances from, said pivot axis for swinging said locking lever to its locking and releasing positions in response to the selective energization of said solenoids; energizing circuit means connected with said solenoids for producing the selective energization thereof; a support pin on said upper end portion; and motion transmitting means comprising a thrust member automatically shiftable on said support pin by said inside control means for transmitting motion from the inside control means to said locking lever for moving the latter to its releasing position; said thrust member having effective and ineffective settings and also having a portion engageable with said locking lever for transmitting actuating motion to the latter when the thrust member is in said effective setting; said thrust member and support pin having cooperating portions providing for adjustable shifting of said thrust member between said effective and ineffective thrust transmitting settings and said thrust member being manually adjustably shiftable on said pin from one to the other of said settings; said retaining means being actuatable by said outside control means to release said latch member whenever said locking lever is in its releasing position regardless of whether said thrust member is in its effective or ineffective setting.

References Cited in the file of this patent

UNITED STATES PATENTS

| | | |
|---|---|---|
| 2,006,624 | Block | July 2, 1935 |
| 2,061,978 | Pentka | Nov. 24, 1936 |
| 2,329,309 | Ward et al. | Sept. 14, 1943 |
| 2,371,370 | Ward | Mar. 13, 1945 |
| 2,505,401 | Ingres et al. | Apr. 25, 1950 |
| 2,658,781 | Allen | Nov. 10, 1953 |
| 2,662,942 | Winkler | Dec. 15, 1953 |
| 2,711,448 | Shewmon et al. | June 21, 1955 |
| 2,726,534 | Beymer | Dec. 13, 1955 |
| 2,793,258 | Engelage | May 21, 1957 |
| 2,799,154 | Beal | July 16, 1957 |
| 2,800,787 | Jeavons | July 30, 1957 |
| 2,811,381 | Allen | Oct. 29, 1957 |
| 2,842,953 | Troudt | July 15, 1958 |
| 2,852,927 | McCurdy | Sept. 23, 1958 |
| 2,859,998 | Martens et al. | Nov. 11, 1958 |
| 2,897,326 | De Vito | July 28, 1959 |